United States Patent [19]

Westelaken

[11] 4,424,634
[45] Jan. 10, 1984

[54] MODULAR COLUMN DRYER FOR PARTICULATE MATERIAL

[76] Inventor: Christianus M. T. Westelaken, St. Mary's, Ontario, Canada

[21] Appl. No.: 275,311

[22] Filed: Jun. 19, 1981

[51] Int. Cl.³ .............................................. F26B 17/12
[52] U.S. Cl. ........................................ 34/167; 34/168; 34/174
[58] Field of Search ................... 34/65, 167, 168, 169, 34/165, 174, 176

[56] References Cited

U.S. PATENT DOCUMENTS

| | | | |
|---|---|---|---|
| 2,732,630 | 1/1956 | Markowich | 34/174 |
| 3,000,110 | 9/1961 | Forth et al. | 34/167 |
| 3,040,443 | 6/1962 | Bopf | 34/174 |
| 3,053,522 | 9/1962 | Applegate | 263/30 |
| 3,237,315 | 3/1966 | Benecke | 34/65 |
| 3,238,640 | 3/1966 | Fry | 34/167 |
| 3,426,442 | 2/1969 | Satake | 34/102 |
| 3,645,006 | 2/1972 | Anderson | 34/22 |
| 3,751,824 | 8/1973 | Kyle | 34/174 |
| 4,149,844 | 4/1979 | Noyes | 34/174 |

FOREIGN PATENT DOCUMENTS 1497602 8/1966 France .

*Primary Examiner*—Larry I. Schwartz
*Attorney, Agent, or Firm*—Dann, Dorfman, Herrell and Skillman

[57] ABSTRACT

A modular column dryer for particulate material including a housing with a removable module supported in the housing. The removable module includes at least one support member and a first pair of generally vertical side panels having perforations therein. The side panels are fixed to the support member to form at least a part of a first column for receiving particulate material and directing the material through the housing. Means is provided for introducing moist particulate material into a top portion of the column. Drying air is passed through the column for drying particulate material therein. A discharge mechanism is provided to remove the dried particulate material from a bottom portion of the column.

8 Claims, 14 Drawing Figures

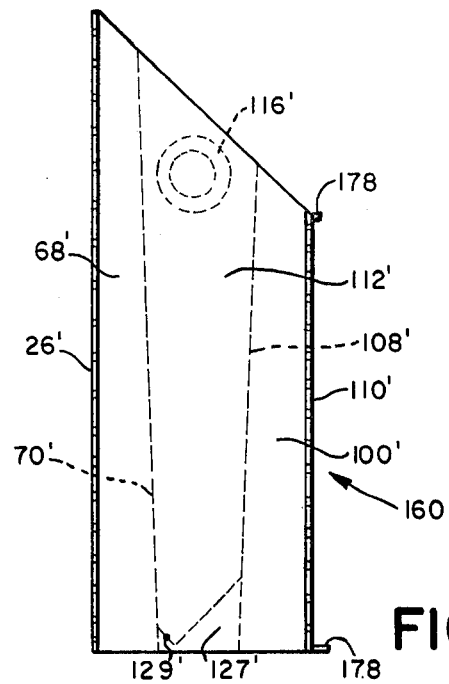
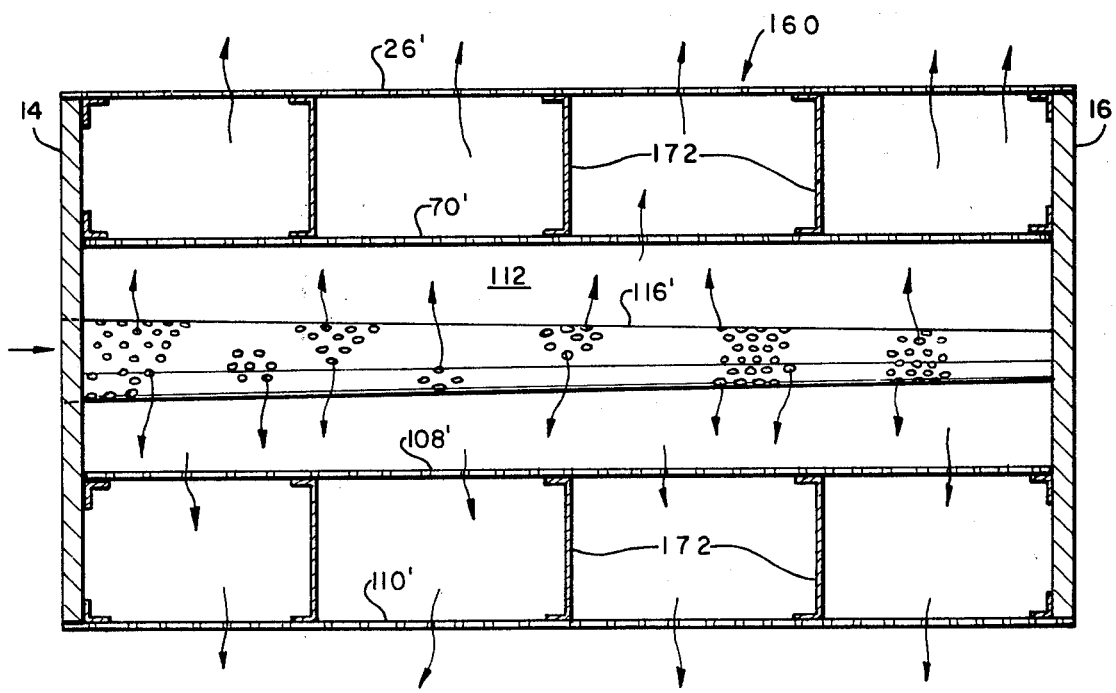

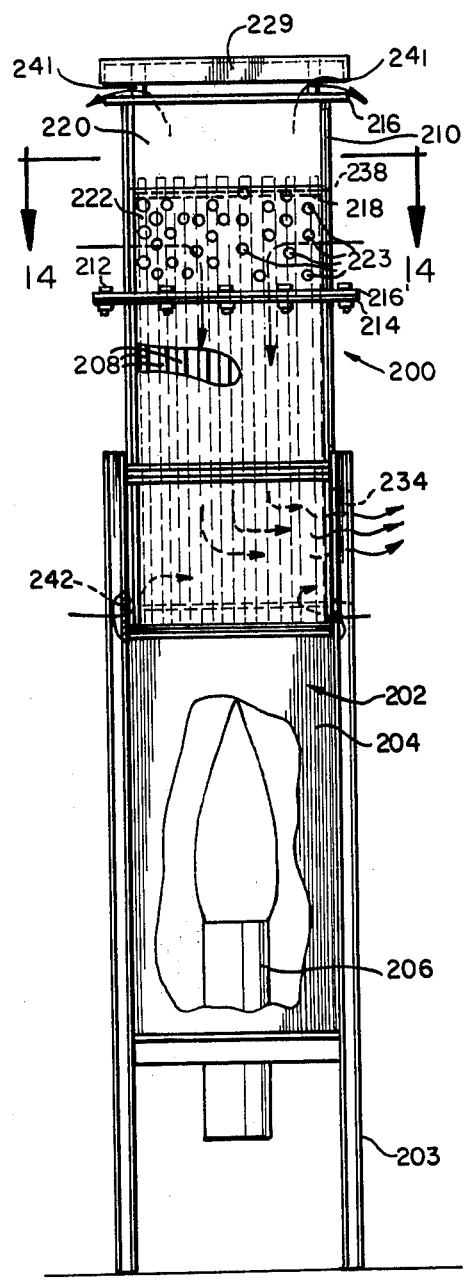
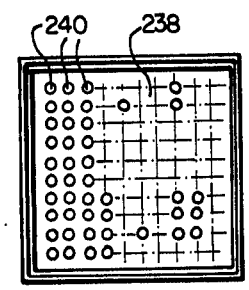
FIG. 13
FIG. 14

MODULAR COLUMN DRYER FOR PARTICULATE MATERIAL

BACKGROUND OF THE INVENTION

1. Field of the Invention

The present invention relates to gravity flow dryers for particulate material and, more particularly, to such a dryer having a drying column comprised of a removable module.

2. Description of the Prior Art

It is often necessary or desirable to dry freshly harvested grain before it is processed or stored. Storage of grain with excess moisture may cause quality deterioration and spoilage during subsequent storage.

The need to dry grain prior to storage has long been recognized in the art and many grain drying systems have been developed to accomplish this purpose. In many such prior systems, the grain is heated by air at a predetermined temperature during a first drying process and then the grain is quickly cooled to a desired storage temperature by exposing the grain to a flow of ambient air. One such system is the cross-flow column type grain dryer in which grain flows downwardly by gravity through a column having perforate walls and heated air is forced transversely through the perforate walls of the column to contact the grain to dry the grain or remove moisture. Typical of such cross-flow grain dryers are the grain dryers shown and described in U.S. Pat. No. 2,732,630 to Markowich and U.S. Pat. No. 3,238,640 to Fry.

The size of the perforations in the column walls in the typical prior art grain dryers has been set for the particular material to be dried. For example, if the dryer is to be used to dry corn, the perforations are somewhat smaller than the size of the corn. However, when drying smaller grains, such as rice, the perforations are smaller than when the dryer is designed for drying corn. Obviously, it is not feasible to dry small size grain in a dryer having large perforations in the walls defining the grain columns. Correspondingly, while it is possible to dry corn in a dryer having the small-sized perforations, as used in a rice or rope seed dryer, such drying is inefficient in that the air flow through the column is more restricted than desired. Thus, with the prior art dryers, it was necessary to have separate dryers for different types of grain or other particulate material to be dried. While some prior art dryers may have had perforate walls that were removed and replaced with walls having perforations of the same or a different size, such a conversion process was cumbersome and the dryers were not adapted to have removable modules for efficient and effective conversion involving a minimum of operator time and shut-down of the dryer. The present invention comprises a dryer having a removable module incorporating the columns, which can be quickly and conveniently removed and replaced to provide side walls having perforations appropriately sized for the material to be dried.

SUMMARY OF THE INVENTION

Briefly stated, the present invention provides a gravity flow grain dryer for particulate material comprising a housing and a removable module supported in the housing. The removable module is comprised of at least one support member and a first pair of generally vertical side panels having perforations therein. The side panels are fixed to the support member to form at least a first column adapted to receive the particulate material and direct the material through the housing. Means are provided for introducing moist particulate material into a top portion of the column and means are provided for removing dried particulate material from a bottom portion of the column. Means are also provided for introducing drying air into the column through the perforations in at least one of the side panels for drying the particulate material in the column.

BRIEF DESCRIPTION OF THE DRAWINGS

The foregoing summary, as well as the following detailed description of preferred embodiments of the present invention, will be better understood when read in conjunction with the accompanying drawings, in which:

FIG. 5 is a slightly enlarged end elevational view of a module portion of the dryer of FIG. 4 and showing the module removed from the housing;

FIG. 6 is an enlarged plan view of the drying column module of FIG. 5;

FIG. 13 is a side elevational view with parts broken away of the heating system of FIG. 10 with the upper tubular structural portion reversed; and FIG. 14 is a sectional view of the heating system of FIG. 13 taken along the lines 14—14.

DESCRIPTION OF THE PREFERRED EMBODIMENT

Figure 1:
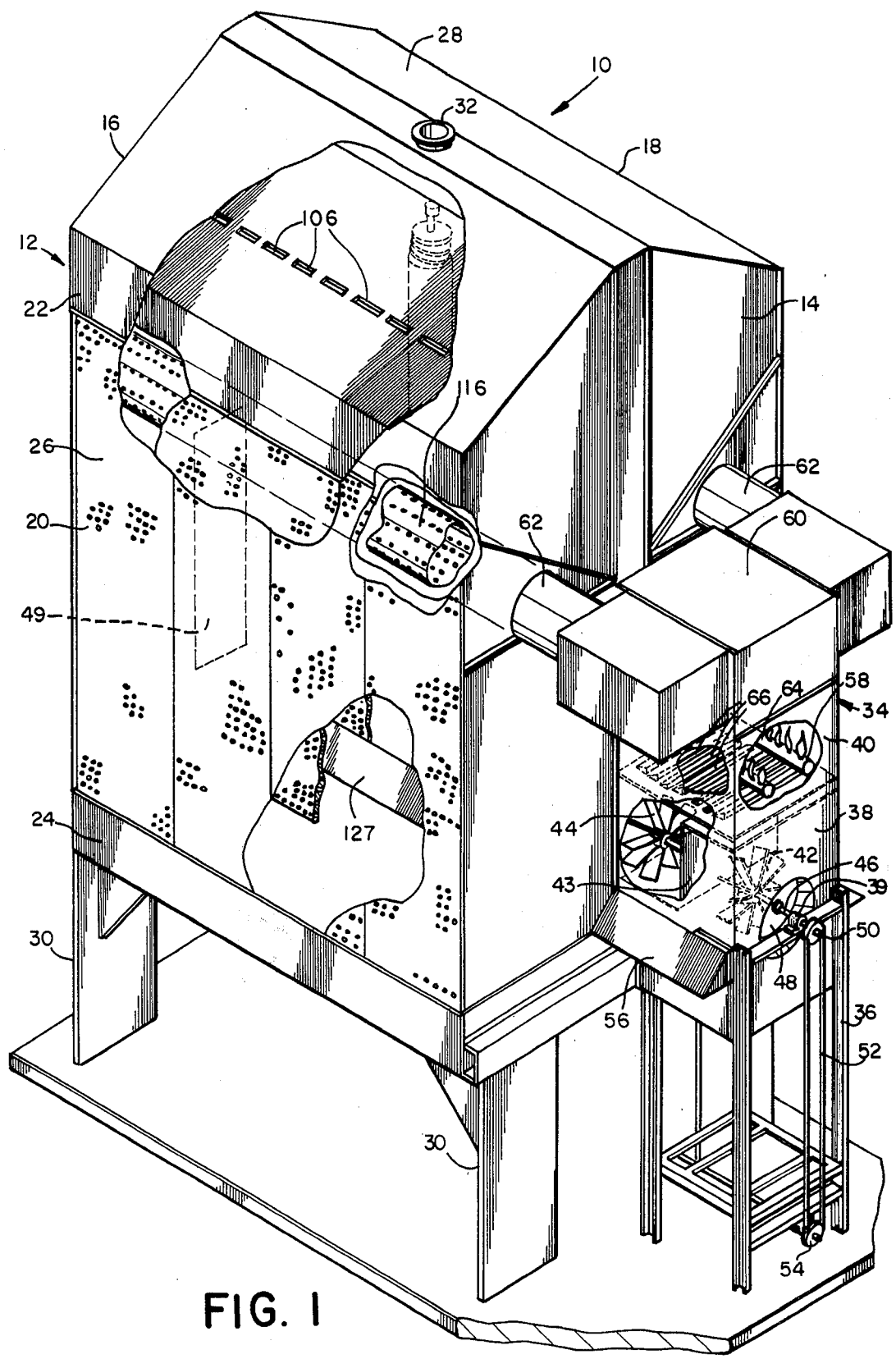
FIG. 1 is a perspective view, with parts broken away, of a grain dryer in accordance with the present invention.
Figure 2:
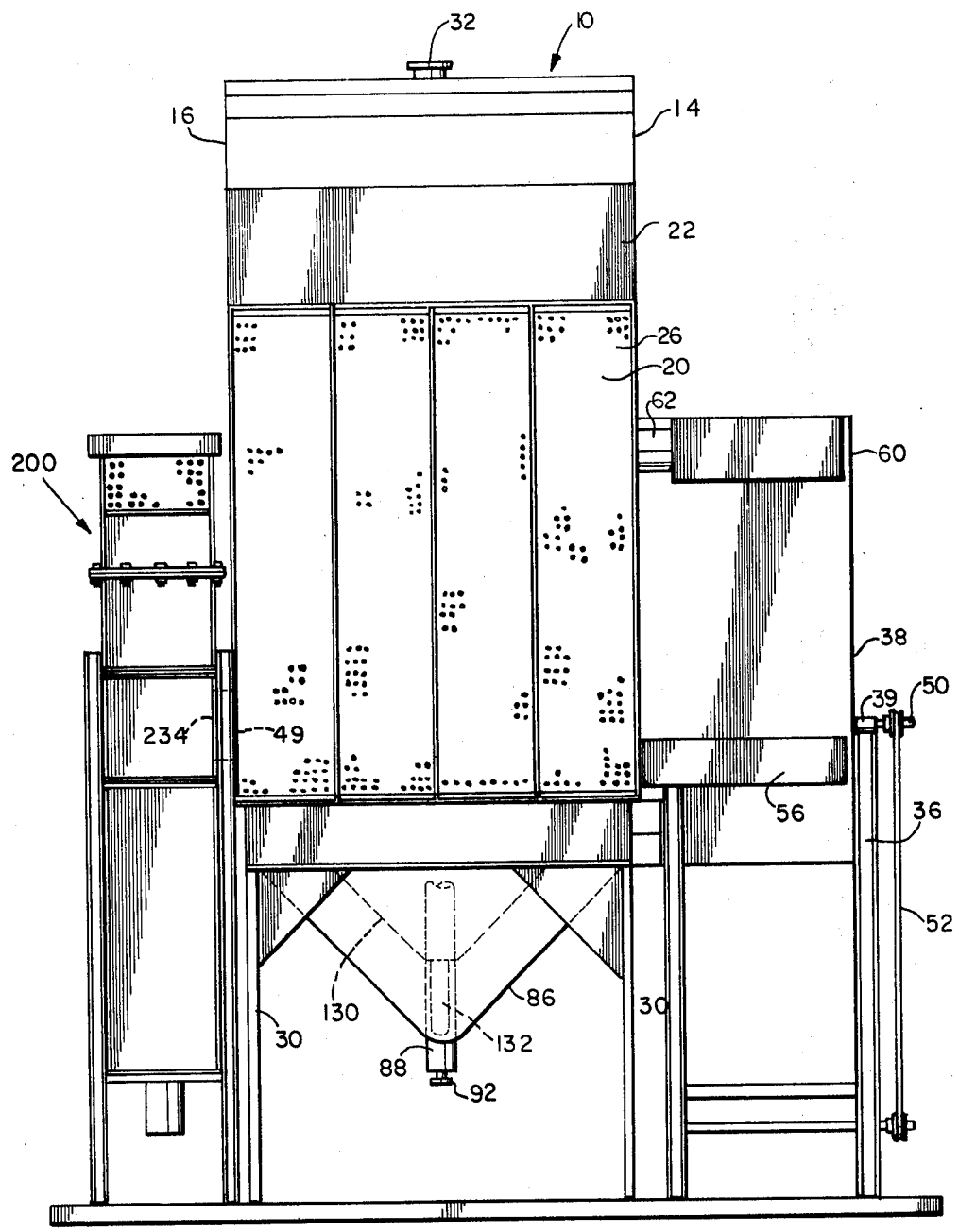
FIG. 2 is a side elevational view of the dryer shown in FIG. 1 with the addition of an alternate air heating system.

Referring to the drawings, and particularly to FIG. 1, there is shown a column type gravity flow dryer for particulate material, for example, corn or other type grain. The dryer, generally designated 10, includes a generally square-shaped housing 12 comprised of a pair of solid end walls 14 and 16 and a pair of side walls 18 and 20. Each of the side walls 18 and 20 includes solid upper and lower portions 22 and 24, respectively, and a perforate intermedite portion 26. The housing 12 further includes a suitable roof 28 and is supported at the bottom by suitable support means or legs 30. At the top of the housing 12 is a means for introducing moist particulate material or grain into the top portion of the housing, in this embodiment, a suitably sized wet grain inlet 32.

On the outside of the housing 12 adjacent end wall 14, is an assembly or means 34 for providing drying air and cooling air to the housing 12. The assembly 34, which is supported by a suitable support frame 36, generally includes a blower section 38 and a heater section 40.

The blower section 38 comprises a pair of blowers or fans 42 and 44 both of which are mounted for rotation on a single shaft 46. The fan shaft 46 extends outwardly through a generally circular cooling air inlet opening 48 in the blower section 38 and is journaled for rotation within a suitable bearing 39. A suitable drive pulley 50 is mounted on the outwardly extending end of the fan shaft 46. The drive pulley 50 is driven to rotation by means of a standard drive belt system 52 which also engages a second drive pulley 54. The drive pulley 54 may be driven by any suitable means, for example, an electric motor or a power takeoff mechanism on a tractor or other vehicle (not shown).

The fan 42, which is closest to the cooling air inlet opening 48, is the cool air fan and the fan 44, which is furthest from the air inlet opening 48, is the hot air fan, the fans being separated by a vertical partition 43 to form individual chambers surrounding each fan. Cooling air is drawn in through the inlet opening 48 by the cool air fan 42 and is directed into a pair of cool air ducts 56 which in turn direct the cooling air into the dryer housing 12. The hot air fan 44 draws air in through a second generally rectangular air inlet opening 49 located in the other housing end wall 16 at the opposite end of the housing and the hot air fan 44 directs the flow of air upwardly into the heater section 40. The heater section 40 includes a burner 58 which heats the air received from the fan 44. In the preferred embodiment, the burner 58 may be a standard Maxon gas burner. The heated air from the burner 58 passes into a collector chamber 60 and thereafter is directed into the housing 12 by a pair of generally cylindrical hot air ducts 62.

The heater section 40 and the blower section 38 are separated by a generally horizontally disposed partition 64 which contains an airflow control means, comprising in this embodiment, a plurality of adjustable dampers 66. The adjustable dampers 66 are provided to control the flow of air from the hot air fan 44 to the burner 58. In this manner, it is possible to effectively regulate the hot air flow into the housing 12 to efficiently dry a variety of different types of particulate material. For example, it may be desirable to provide a large hot air flow into the housing 12 for drying high moisture content corn and a much smaller hot air flow into the housing 12 for drying lower moisture content rice. Thus, the adjustable dampers 66 may be set in a substantially fully open position to apply a large hot air flow to dry corn or in a substantially closed position to apply a small hot air flow when drying rice.

Figure 3:
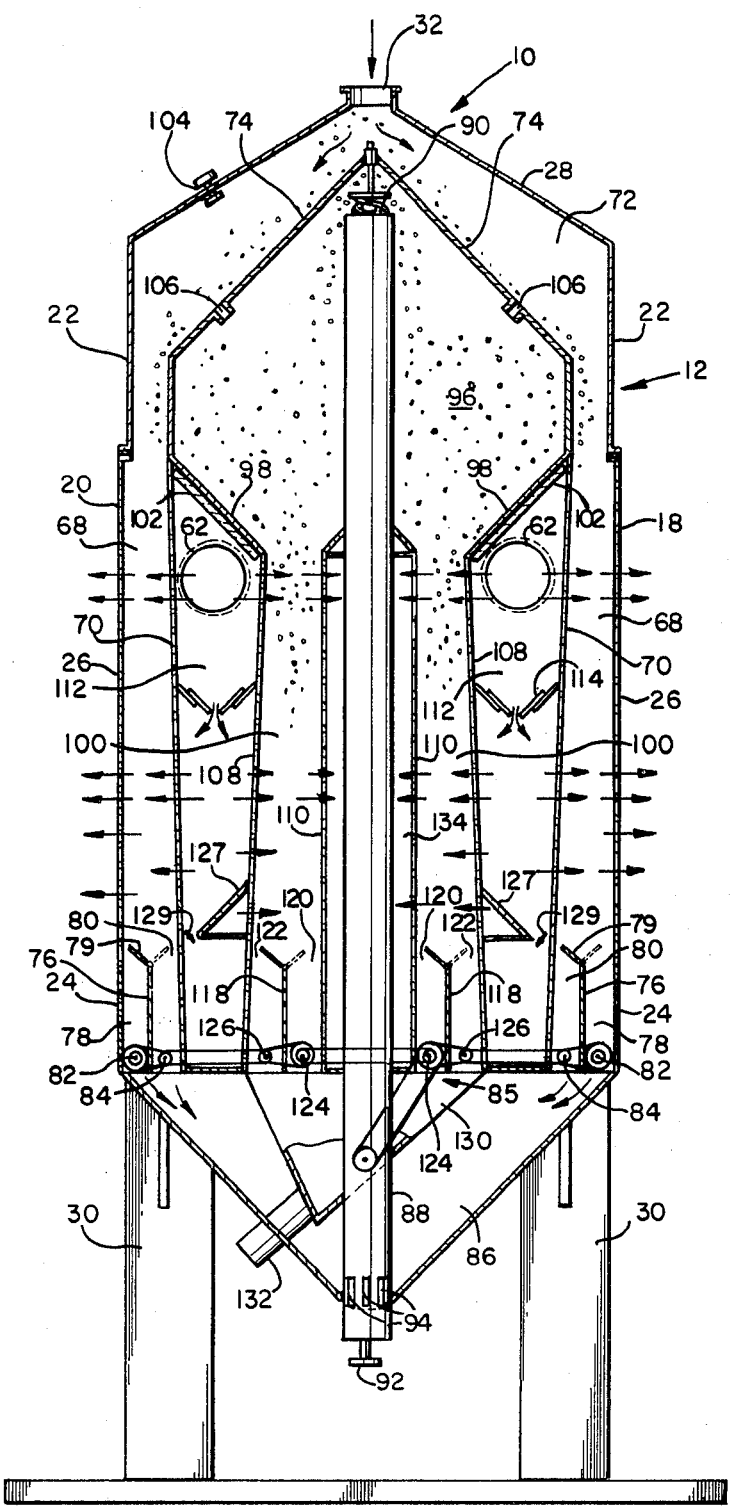
FIG. 3 is a sectional view of a slightly modified version of the dryer of FIG. 1.

Referring now to FIG. 3, there is shown the interior configuration of the dryer of FIG. 1 with a slight variation which will hereinafter be described. The dryer 10 comprises a pair of generally vertical outer drying columns 68, each column being defined by first and second substantially parallel opposed spaced perforate walls 70 and 26. A wet grain hopper 72 is provided at the top portion of the dryer for receiving and temporarily storing the moist grain introduced into the top of the housing 12 through the wet grain inlet 32. The wet grain hopper 72 is defined by the roof panels 28, the side wall upper solid portions 22 and a pair of sloping interior hopper panels 74. The wet grain hopper 72 also functions to distribute the moist grain into the top portions of each of the outer drying columns 68.

In order to provide for a more uniform and less restricted grain flow through the outer drying columns 68, the columns are tapered outwardly from top to bottom so that the width of each of the columns is greater at the bottom than at the top. By tapering the columns in this manner, the air flow is less restricted at the top of the columns (where the grain is wetter and provides a high air flow rate through the outer columns 68) than at the bottom of the columns (where the grain is drier, thereby providing for a more volume controlled airflow through the columns over their entire length.

At the bottom of each of the outer drying columns 68 is a dividing wall means, in the present embodiment a generally vertical partition 76, for dividing the lower portion of each of the drying columns 68 into two generally parallel channels 78 and 80. Each of the channels 78 and 80 preferably contains separate discharge means, in the present embodiment metering rolls 82 and 84, respectively, for discharging particulate material from the channels 78 and 80 at predetermined rates. Both of the metering rolls 82 and 84 are driven by a system of drive belts and pulleys generally designated 85. As shown, the drive pulley for the metering roll 84 is of a smaller diameter than the drive pulley for metering roll 82. Accordingly, metering roll 84 rotates faster than metering roll 82 to thereby discharge grain from the innermost channel 80 at a faster rate than the grain is discharged from the outermost channel 78. The grain from both channels 78 and 80 is discharged by the respective metering rolls 82 and 84 into a receiving hopper 86.

As shown in FIG. 3, heated air from the hot air ducts 62 passes outwardly through the outer drying columns 68 to contact and dry the grain in the columns. Since the heated air enters each of the columns 68 through the inner perforated walls 70, the hottest driest air impinges upon the grain on the side of the drying columns adjacent inner perforated walls 70. As the heated air continues on its path across the columns, a certain amount of heat is lost to the grain in the columns and the air picks up and retains moisture from the grain. By the time the air reaches the grain adjacent the outermost perforate walls 26, a significant portion of the heat has been lost to the grain and the same flow of air is also somewhat moisture laden and not able to dry the grain as effectively. Thus, the drying of the grain is somewhat uneven across the column, the grain adjacent the inner perforate walls 70 becoming drier as it flows down the columns than the grain flowing down the columns adjacent the outer perforate walls 26. By controlling the downward flow rate of the grain through the columns 68 to have the grain adjacent the inner perforate walls 70 flow downwardly at a faster rate than the grain adjacent the outer perforate walls 26, as described above, the faster drying grain is more quickly removed from the columns and the slower drying grain is retained in the columns for a longer period of time and is exposed to the drying air for a longer period of time to promote more uniform drying across the column. In this manner, not only is all of the grain discharged into the receiving hopper 86 with a more uniform moisture content, but, by having the grain adjacent the inner perforate wall 70 moving more rapidly down through the columns, the problems of grain cracking and checking inherent in prior art grain dryers are reduced, since the rapidly dried grain is exposed to the hottest driest air for a shorter period of time.

In order to further control the division of the grain into the channels 78 and 80, the upper end of each of the partitions 78 are provided with an adjustable or pivotable section or divider 79. The adjustable or pivotable sections 79 may be adjusted depending upon the initial moisture content and type of grain being dried to change the relative proportions of the grain entering the channels 78 and 80 in order to further improve the uniformity of the drying across the columns. For example, when drying corn with a very high initial moisture content, it may be desirable to adjust the pivotable sections 79 to provide for a smaller portion of the grain flowing into channels 80 than is flowing into channels 78. In this manner, more of the corn is retained in the drying columns 68 for a longer time period. Correspondingly, when drying corn with a very low moisture content, it may be desirable to adjust the pivotable sections 79 to provide for a larger portion of the grain flowing into channels 80 than is flowing into channels 78, thereby discharging more of the corn from the dryer in a shorter time period. Thus, by adjusting the position of the pivotable sections 79 in conjunction with the predetermined discharge rate from each of the channels 78 and 80, more uniform drying of the grain is accomplished.

The uniformly dried grain discharged from each of the channels 78 and 80 of the outer drying columns 68 is received and collected in the receiving hopper 86. Mounted generally in the center of the receiving hopper 86 is a tube member 88 which extends vertically upwardly into the dryer housing 12. Located within the vertical tube member 88 is a conveyor means, for example, a grain carrying auger 90 which is driven to rotation by means of a suitable drive pulley 92 extending outwardly from the bottom of the receiving hopper 86. The drive pulley 92 may be driven by any suitable means, for example, an electric motor or the power takeoff from a tractor or other vehicle (not shown).

The lower end of the tube member 88 contains a plurality of openings 94 which allow the partially dried grain from the outer columns 68 which has accumulated within the receiving hopper 86 to pass into the tube member 88. The grain passing into the tube member 88 is conveyed or transported upwardly by the rotating grain auger 90 and is discharged from the tube member 88 into a substantially enclosed inner chamber 96. In the present embodiment, the rotation of the grain auger 90 is sufficient to evenly distribute the grain discharged from the tube member 88 over the inner chamber 96. However, in a larger model of the dryer having a larger inner chamber 96, cross-augers or other suitable means (not shown) may be employed to provide an even distribution of the grain across the length and width of the inner chamber 96.

The inner chamber 96 serves as a steeping or tempering chamber for the grain. By allowing the grain to steep or sweat as it moves downwardly through the chamber 96, the moisture removal efficiency, drying uniformity and quality of the grain is greatly improved. Preferably, the grain remains in the steeping chamber for at least one hour. The sloping lower walls 98 of the steeping chamber 96 are at an angle of not less than 45° in order to provide for an acceptable flow of the moist grain downwardly through the steeping chamber. The sloping lower walls 98 of the steeping chamber include suitable insulation 102 to prevent the grain flowing through the steeping chamber adjacent the lower walls 98 from becoming overheated due to its proximity to the incoming heated air passing through the hot air ducts 62. The upper walls 74 of the steeping chamber 96 are also sloped at an angle of not less than 45° to assure an acceptable flow of the incoming moist grain from the wet grain inlet 32 into the outer drying columns 68.

In order to provide for most efficient use of the steeping chamber 96, it should be preferably kept full of grain. To this end, the upper steeping chamber walls 74 include means, for example, a plurality of slots 106 extending therethrough which allow some of the incoming moist grain to pass directly into the steeping chamber 96, in order to make up for any shrinkage of the grain which may have occurred as a result of the drying of the grain as it passed through the outer drying columns 68. The slots 106 may also be employed to control the moisture content of the grain in the steeping chamber in a manner which will hereinafter become apparent. In the steeping chamber, the moisture in the grain tends to equalize for the grain in the chamber.

The roof 28 may also contain a level control means 104 positioned slightly above the slots 106. The level control means 104 functions to actuate an elevator bucket or infeed auger (not shown) to maintain the grain in the wet grain hopper 72 at a level above the slots 106 in order to insure that there is sufficient moist grain available for adding to the steeping chamber 96 to make up for any shrinkage which may have occurred.

The grain in the steeping chamber 96 flows downwardly at a controlled rate and passes into a pair of inner drying columns 100 which are also comprised of first and second perforate walls 108 and 110, respectively. The perforate walls 108 cooperate with perforate walls 70 and with the housing end walls 14 and 16 to form a pair of substantially enclosed plenum chambers 112. The plenum chambers 112 receive the heated air from the hot air ducts 62 and distribute the heated air so that it passes outwardly through the outer drying columns 68 and inwardly through the inner drying columns 100 along the entire length of the columns. The plenum chambers 112 may include suitable adjustable damper means 114 extending across the plenum chambers 112 between the end walls 14 and 16 to further control the distribution of the heated air to the inner and outer drying columns 68 and 100. The damper means 114 limits the amount of air which passes into the lower portion of the plenum chamber 112 to force more air through the upper section of the columns 68 and 100. In order to provide for a more uniform distribution of the heated air within the lower portion of the plenum chambers 112, the openings of the adjustable damper means 114 are tapered extending across the plenum chambers with the larger openings being adjacent end wall 14 or in close communication with the hot air ducts 62 to provide a generally uniform distribution of drying air into the lower portion of the plenum chamber.

Figure 4:
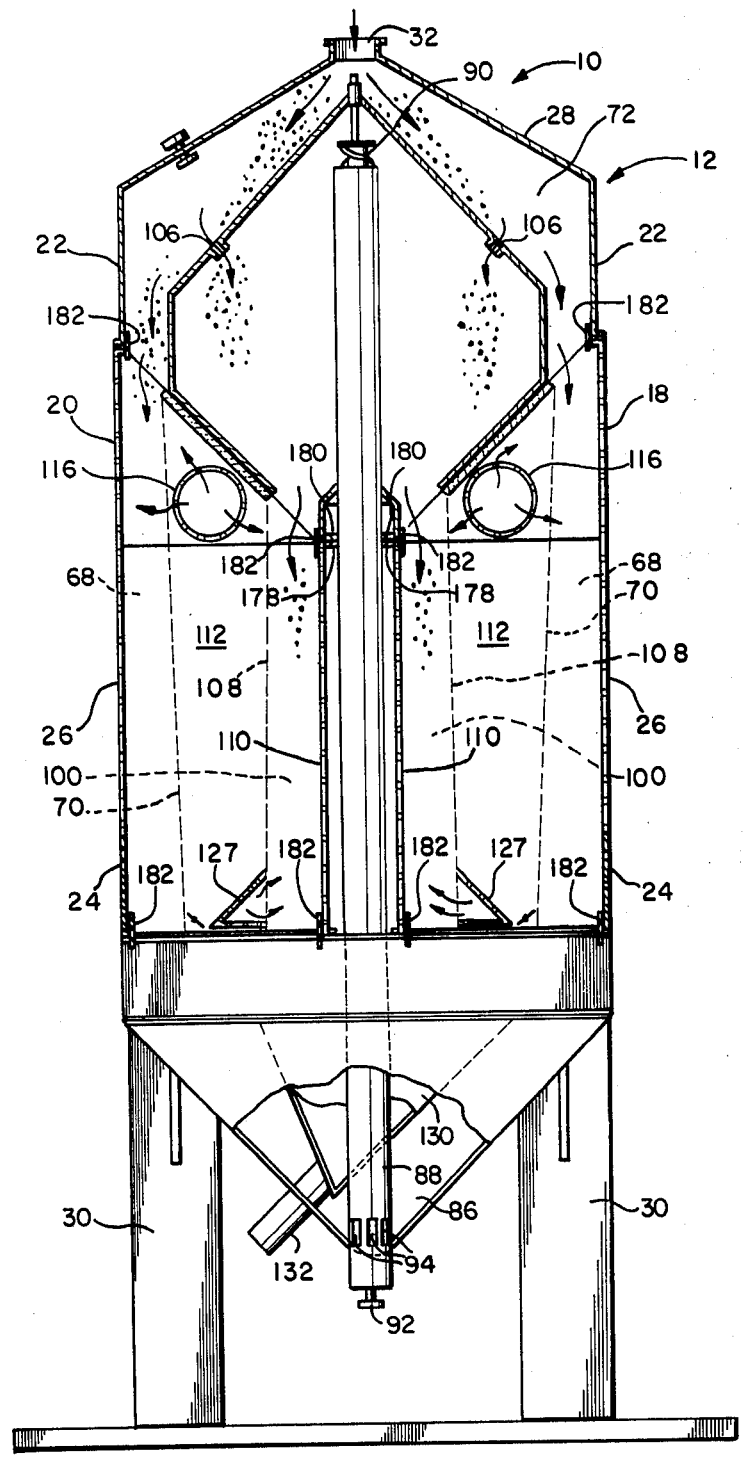
FIG. 4 is an end elevational view of the dryer of FIG. 1 and showing the end wall removed.

FIGS. 1, 4 and 6 show a slightly different structural arrangement for evenly distributing the heated air within the plenum chambers 112. As shown in FIGS. 1 and 6, a pair of tapered perforate tubes 116 (116' in FIG. 6) extend across the plenum chambers 112 between the end walls 14 and 16. The larger end of the tapered tubes 116 are connected to and communicate with the hot air ducts 62 to receive the flow of heated air therefrom.

Because the tubes 116 are tapered, the amount of heated air that passes along the length of the tube is restricted, thereby providing a uniform static pressure distribution along the length of the tube to insure a uniform airflow out of the perforations. The uniform air flow from the tapered tubes 116 provides a generally uniform distribution of the heated air along the tubes and throughout the plenum chamber 112, thereby providing a more uniform flow of the heated air through the columns 68 and 100 along their entire length. Alternatively, the tapered tubes 116 may be replaced with constant diameter tubes (not shown) having perforations varying in size and percentage of total opening along the length of the tubes, (the end of the tubes connected to the hot air ducts 62 having the larger diameter perforations and greater percentage of openings) to provide the desired generally uniform static pressure distribution along the length of the tubes into the plenum chamber.

Referring again to FIG. 3, the inner drying columns 100 also have a generally vertical partition 118, which divides each column into inner and outer channels 120 and 122 in a manner corresponding to the partitions 76 for the outer drying columns 68. Discharge means in the form of metering rolls 124 and 126 are also provided for discharging grain from the inner and outer channels 120 and 122, respectively. As with the metering rolls associated with the outer drying columns 68, the metering rolls 124 and 126 also turn at different predetermined rates for discharging the grain from the channels 120 and 122 at different rates. Preferably, the metering rolls 126 adjacent the first perforate walls 108 discharge the material at a rate faster than the metering rolls 124.

As shown on FIGS. 1 and 3, a pair of distribution ducts 127 having triangular cross-sections extend across the plenum chambers 112 between the end walls 14 and 16. One end of the distribution ducts 127 is connected to the cooling air ducts 56 for receiving the cooling air flow. The ducts 127 have one wall provided by the perforated walls 108, which provide for the passage of cooling air into the lower portion of the inner drying columns 100. Adjacent each of the ducts 127 are small access or clean-out doors 129 to provide for the removal of debris which may accumulate within the plenum chambers 112.

The inner drying columns 100 may also be wider at the bottoms than at the tops in a manner similar to that of the outer drying column 68 for substantially the same reasons as discussed above. Grain from the channels 120 and 122 of the inner drying columns 100 is discharged into a second or inner receiving hopper 130. Grain from the second receiving hopper 130 may be removed from the dryer by means of a discharge tube 132 and may thereafter be transported to a suitable storage facility (not shown).

The dryer 10 also includes a central inner chamber 134 surrounding the vertical tube member 88 and formed on opposite sides by the innermost perforate walls 100. The central chamber 134 extends the entire length of the dryer between end walls 14 and 16 (shown on FIG. 1) and provides the conduit between the hot air fan 44 and the second air inlet opening 49 for the movement of ambient air into the inlet of the hot air fan 44. The central chamber 134 also receives and collects both the heating and cooling air exhausted from the inner drying columns 100 and recycles or recirculates this exhausted air back to the hot air fan 44. By mixing the incoming ambient air with the air exhausted from the inner drying columns 100 in this manner, the air entering the heater section 40 is effectively pre-heated, thereby requiring the addition of considerably less thermal energy to raise the air to the desired or requisite drying temperature. Although the benefits of recirculating or recycling air in a grain dryer are well known, recycling heated air through an interior chamber in this manner is highly desirable because the heated recycled air is insulated by the surrounding dryer structure, thereby preventing any substantial radiation loss of the heat energy contained within the recycled air. In addition, by employing such a central recycling chamber 134, the dryer structure can be greatly compacted. Furthermore, due to the insulation of the surrounding structure, moisture condensation and dripping problems, which have plagued some prior art recirculating dryers of other designs, are avoided.

Figure 8:
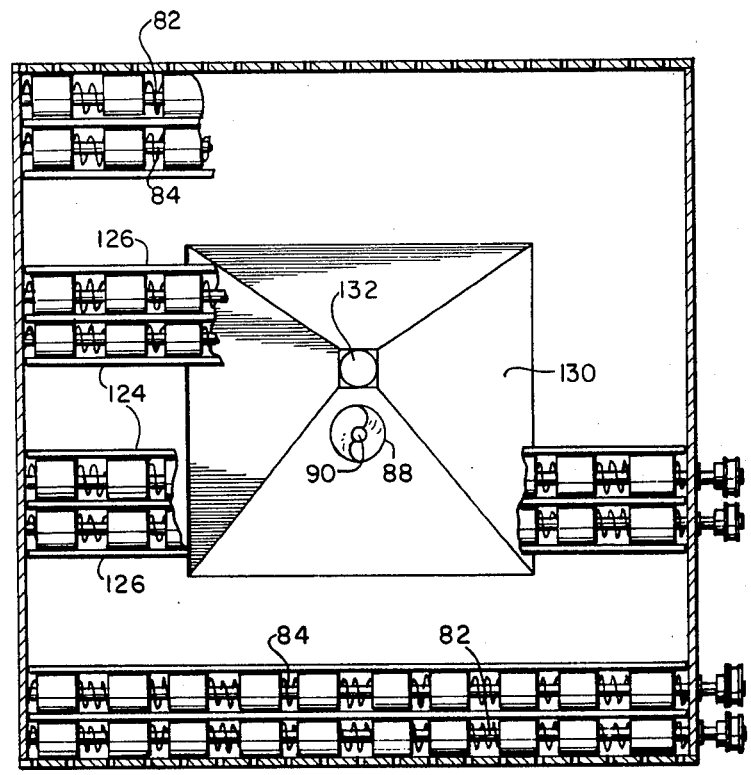
FIG. 8 is a sectional view taken along the lines 8—8 of FIG. 7.
Figure 7:
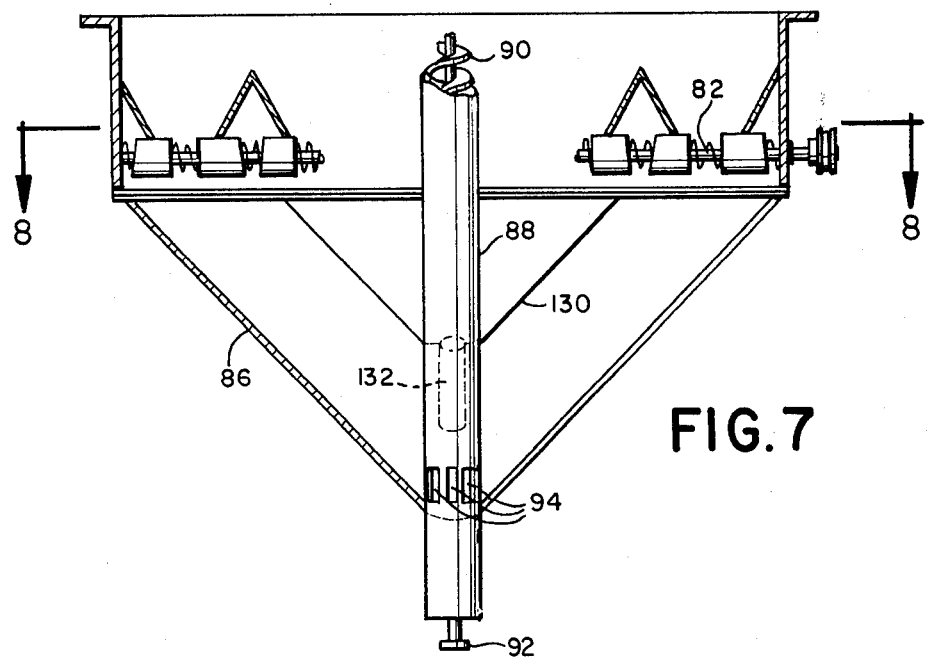
FIG. 7 is an enlarged side sectional view with parts broken away of the lower portion of the dryer of FIG. 2.
Figure 9:
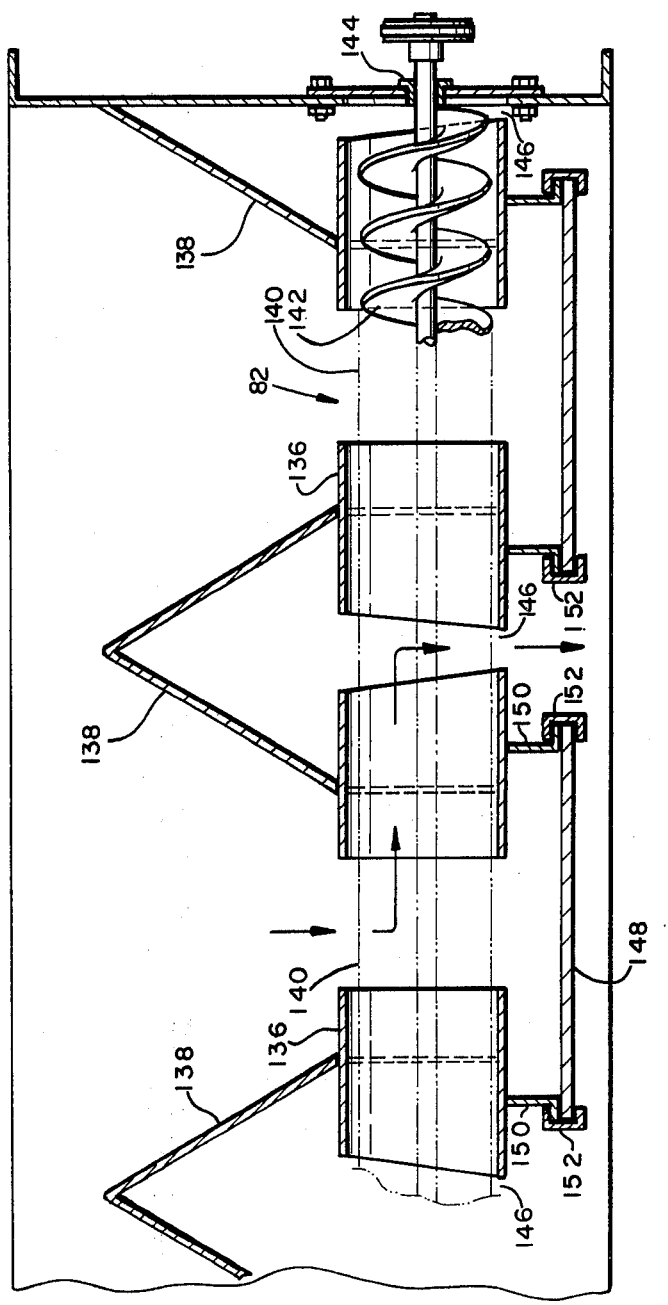
FIG. 9 is an enlarged side elevational view of one of the dryer arrangements of a portion of FIG. 7 and showing parts broken away.

FIGS. 7, 8 and 9 show additional details of the lower portion of the dryer, including the grain discharge means. As shown on FIG. 9, metering roll 82 is retained within a plurality of aligned spaced-apart tubular members 136. Adjacent to and above the tubular members 136 are a plurality of inverted V-shaped members 138, which serve as deflectors to direct the downward flow of grain into the spaces 140 between the tubular members 136. The metering roll 82 further comprises a horizontal rotating grain auger 142 disposed within the tubular members 136. The grain auger is supported by, for example, a suitable bearing 144 and is driven, for example, by means of a suitable drive pulley of the type hereinbefore described. Grain flowing downwardly in each of the channels of the drying columns is deflected by the inverted V-shaped members 138 into the spaces 140 between the tubular members 136 where it is received and carried by the rotating grain auger 142 as shown by the flow arrows. Thereafter, the grain is discharged from the grain auger 142 through a plurality of openings 146 located between the lower portions of each of the tubular members 136 and the grain enters the receiving hopper 86, as shown in FIG. 3. Each of the spaces 140 between the tubular members 136 is enclosed and includes a removable bottom panel 148, which is retained in place as shown by means of a pair of supporting side flanges 150 and a pair of suitably sized U-shaped clamps 152. By removing the U-shaped clamps 152, the bottom panels 148 may be conveniently removed for cleaning out the space 140 and the grain auger 142. The combination of the metering rolls and the inverted V-shaped members 138 provide for a uniform withdrawal of grain across each of columns of the dryer. Additional details concerning the structure and operation of the grain discharge means may be obtained from U.S. Pat. No. 4,152,841, which is hereby incorporated by reference. The other metering rolls 84, 124 and 126 operate and are constructed similarly to metering rolls 82.

In cross flow dryers of the type shown, it is desirable to use the same dryer to dry particulate materials or grains of widely varying dimensions. For example, it may be desirable to dry either corn or rice in the same dryer. In order to be able to dry such different types of grains in the same dryer without any considerable loss of product or drying efficiency, it is necessary to have the ability to conveniently vary the size of the openings in the dryer's perforate walls forming the drying columns.

Referring to FIGS. 5 and 6, the present invention employs removable modules 160 to accomplish this result. Each module, generally designated 160, is complete in itself and comprises four generally parallel perforate side panels 110', 108', 70' and 26', which are fixed to a plurality of generally vertical support members or cross braces 172. In FIGS. 5 and 6, primes are used to designate component parts of the module 160, the primes being dropped when the module 160 is installed in the dryer 10 as shown on FIG. 4 (FIG. 3 does not show the modular construction features of the dryer 10). The perforate panels 110', 108', 70' and 26' may all be of one piece construction or may be made up of a plurality of individual smaller panels which are attached to the cross braces 172. The perforate panels 110', 108', 70' and 26' cooperate to form a pair of drying columns 100' and 68' with a plenum chamber 112' therebetween. A tapered perforate tube 116', a generally triangularly-shaped distribution duct 127' in cross-section having a perforated side wall 108' as a part thereof, and a clean-out door 129' are also included as part of the module 160 as shown.

When a pair of complementary modules 160 are placed in position in the dryer housing 12 as shown in FIG. 4, they form essentially all of the drying columns 68 and 100. The upper and lower portions of the modules 160 are suitably contoured to enable the modules to be appropriately positioned within the dryer housing 12 as shown in FIG. 4. The tapered perforate tubes 116 are connected to and cooperate with the hot air ducts 62 (shown in FIG. 1) for the distribution of hot air within the plenum chamber 112. Likewise, the triangular-shaped air ducts 127 are connected to and cooperate with the cooling air ducts 56 (shown in FIG. 1) to provide a flow of cooling air when the modules 160 are in place within the dryer housing 12. Suitable sealing means (not shown) may be provided to prevent air leakage from around the connection of the perforate tubes 116 and the triangular-shaped ducts 127 with the hot air ducts 62 and cooling air ducts 56. A number of small flanges 178 on the corners of the modules 160 engage suitable complementary flanges 180 on the dryer housing 12 in order to properly position and retain the modules 160 in place within the housing 12. A plurality of sealing means, for example, neoprene flaps 182, are employed to close any gaps or openings which may occur along the joint lines where the modules 160 meet the dryer housing 12 and to prevent the leakage of any grain through any such gaps or openings.

From the above description of the modules 160, it is readily apparent that the modules 160 may be installed or removed from the dryer housing 12 shown in FIG. 4 with relative ease. Each dryer 10 has one or more pairs of such modules 160. Each pair of such modules 160 has perforate side panels 110', 108', 70' and 26' with perforations of a different size than the other pairs of modules. For example, one pair of modules have perforations ideally suited for drying rice, whereas another pair of modules will have perforations ideally suited for drying corn. In this manner, greater flexibility and drying efficiency may be achieved with a single basic dryer structure.

The dryer 10 may be operated as a batch-type dryer or as a continuous flow-type dryer. In either type of dryer operation, an operator makes a determination as to what type of grain is to be dried and the initial moisture content of the grain. The operator then selects the appropriate pair of modules 160 for the grain to be dried and installs the modules in the dryer housing 12 as shown in FIG. 4. The operator also adjusts the adjustable air flow dampers 66 (shown in FIG. 1) to the proper setting to provide the desired air flow to provide optimum drying for the particular grain being dried. Likewise, the operator adjusts the pivotable sections 79 on the partitions 78 and 118 (shown in FIG. 1) to determine the relative portion of the grain which will be rapidly discharged from the grain columns 68 and 100 as described in detail above.

In operation as a continuous flow dryer (referring to FIG. 3), the dryer is then activated and the grain to be dried is fed into the wet grain inlet 32. The grain from the wet grain inlet 32 flows downwardly into the wet grain hopper 72 and is introduced into the top of the outer drying columns 68. As the grain flows downwardly through the outer drying columns 68, heated air from the plenum chamber 112 flows outwardly through the grain to heat the grain and remove moisture therefrom. The drying air passes outwardly through the outer perforate wall 26 to the atmosphere. As the grain flows downwardly through the column, it becomes increasingly drier due to its continued contact with the heated air. As discussed in detail above, the grain flowing down the columns adjacent to perforate walls 70 is dried more rapidly than the grain flowing down the column adjacent outer walls 26. Accordingly, as also discussed in detail above relative to FIG. 3, the grain flowing through the columns 68 adjacent perforate walls 70 is discharged from the columns 68 at a faster rate than the grain flowing down the column adjacent the perforate walls 26.

All of the grain discharged from the outer columns 68 is received and collected in the first receiving hopper 86. The collected grain flows downwardly within the hopper 86 and enters the vertical tube member 88 through the openings 94. The rotating grain auger 90 within the vertical tube member 88 transports the grain upwardly to the top of the tube member 88 where it is discharged into the steeping chamber 96.

After an initial startup period, the steeping chamber 96 is generally filled with partially dried grain. Due to the relatively large size of the steeping chamber 96 with respect to the inner drying columns 100 which receive the grain discharged from the steeping chamber, the grain introduced to the top of the steeping chamber 96 moves slowly down from the steeping chamber 96 at a predetermined uniform rate. It is anticipated that the grain remains in the steeping chamber for at least a one hour period. While within the steeping chamber, the grain is steeped or sweats in a manner well known in the art.

After passing out of the steeping chamber 96, the grain enters the inner drying columns 100 and passes downwardly therethrough. At the top of the inner drying columns 100, the grain is again exposed to a flow of heated drying air, which passes inwardly from the plenum chambers 112, through the columns 100 and into the central chamber 134, as shown in FIG. 3. As the grain moves further down the inner columns 100, it is exposed to the cooling air which passes inwardly from the cooling air distribution ducts 127, through the columns 100 and into the central chamber 134. The dried and cooled grain is then discharged into the second or inner receiving hopper 130. The grain may then be removed from the dryer by means of the discharge tube 132 for subsequent storage and/or use.

In addition to making up for the shrinkage of the grain within the steeping chamber 96, the slots 106 may be employed in conjunction with the metering rolls 124 and 126 at the bottom of the inner drying columns 100 to further control the moisture content of the grain discharged from the dryer 10. More specifically, by putting the metering rolls 124 and 126 on a separate drive (not shown), the amount of wet grain which enters the steeping chamber 96 through the slots 106 may be accurately controlled. For example, by having the metering rolls 124 and 126 turning faster than the metering rolls 82 and 84 of the outer drying columns 68, the flow of wet grain through the slots 106 is increased, thereby increasing the overall moisture content of the grain in the steeping chamber and, correspondingly, increasing the overall moisture content of the grain discharged from the dryer. By controlling the moisture content through grain mixing in this manner, the dryer 10 is better able to dry various types of grains having various initial moisture contents to a specified final moisture content.

As discussed in detail above, the heated air passing through the inner drying columns 100 enters the central chamber 134 and is recycled back to the hot air fan 44 for reuse. Likewise, the cooling air which has passed through the inner columns 100 and has picked up heat from the heated grain within the columns is recycled back to the hot air fan 44 in the same manner. The heated air passing through the outer columns 68 is too saturated with moisture which has been removed from the grain, to be of desired use in recycling, and, thus, is exhausted to the atmosphere through the outer perforate walls 26.

Referring now to FIGS. 2 and 10-14, there is shown an alternate apparatus generally designated 200 for providing a flow of heated air to the dryer 10. The air heating apparatus 200 may be employed to provide direct or indirect heated air to the dryer 10. By direct heated air, it is meant that the air provided by the apparatus 200 to the dryer includes the combustion gas. By indirect heated air, it is meant that the air supplied by the apparatus 200 to the dryer contains no combustion gas. The air heating apparatus 200 may be employed as a replacement for the burner 58 (shown in FIG. 1), when it is desirable to provide indirectly heated air to the dryer for drying certain particulate material, for example sunflower seeds, which are highly flammable.

Figures 10, 11, 12:
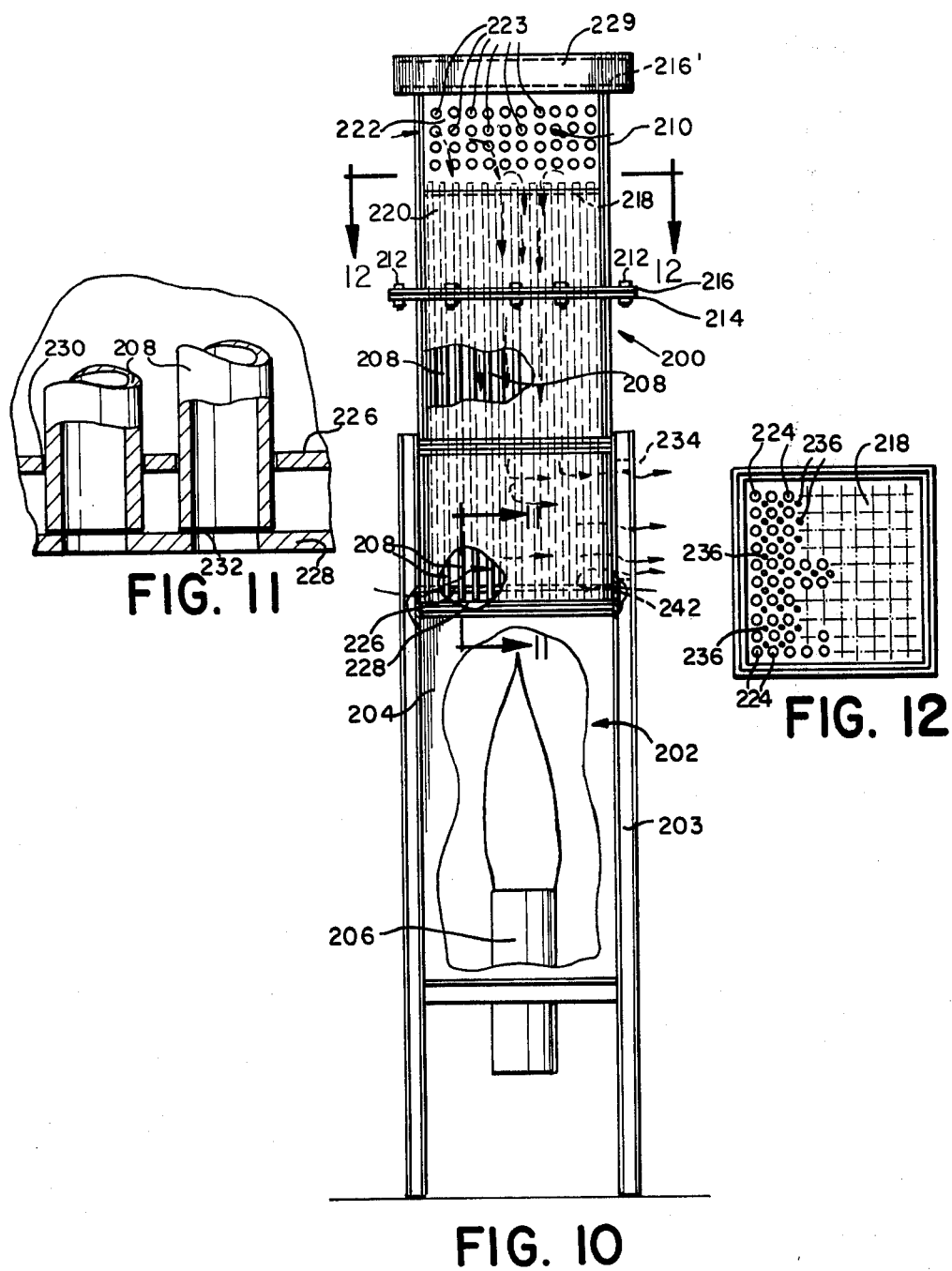
FIG. 10 is a side elevational view, with parts broken away, of the alternate air heating system as shown added to the end of the dryer in FIG. 2.
FIG. 11 is a greatly enlarged sectional view of a portion of the heating system of FIG. 10 taken along the lines 11—11.
FIG. 12 is a sectional view of the heating system of FIG. 10 taken along the lines 12—12.

Referring now to FIG. 10, the air heating apparatus 200 comprises a generally vertical base portion generally designated 202 mounted on a suitable support frame 203 and includes a combustion chamber 204 having a burner or heater 206 therein. Directly above the combustion chamber 204 is a plurality of generally vertical exhaust tubes 208. A typical air heating apparatus may contain as many as 784 such open tubes, each tube being approximately 10 feet long. The lower end of each of the tubes 208 communicates directly with the combustion chamber 204 for receiving the combustion gas from the burner 206.

A reversible tubular structure 210 is releasably attached to the top of the base portion 202 by means of a plurality of nuts and bolts 212 which extend through cooperating aligned flanges 214 and 216 located respectively on the base portion 202 and the tubular structure 210. The tubular structure 210 includes a generally horizontal partition means or partition 218 for dividing the tubular structure into two generally equal sized chambers 220 and 222. The first chamber 220 (adjacent the base portion 202 on FIG. 10) has generally solid side walls, while the second chamber 222 (remote from the base portion 202 on FIG. 10) has side walls with perforations 223 providing air inlet means for admitting fresh ambient air into the air heating apparatus. The tubular structure 210 may be removed from the base portion 202 and turned over or reversed to a position as shown on FIG. 13, with the second (perforated wall) chamber 222 adjacent the base portion 202, and with the first (solid wall) chamber 220 being remote from the base portion 202. The reversal of the tubular structure 210 is accomplished by simply removing the nuts and bolts 212 from the flanges 214 and 216, reversing end-for-end the tubular structure 210, and replacing the nuts and bolts 212 through the corresponding aligned flanges 214 and 216'. Whether the tubular structure 210 is in the direct heating position as shown on FIG. 10 or is reversed to the indirect heating position as shown on FIG. 13, the chamber adjacent the base portion 202 serves as a heat exchange chamber, while the chamber remote from the base portion 202 functions as a manifold chamber.

Referring again to FIG. 10, the vertical tubes 208 extend upwardly from the base portion 202, through the heat exchange chamber 220 and through a plurality of circular openings 224 in the horizontal partition 218, as shown in FIG. 12, one such opening for each tube 208. The partition openings 224 retain the upper ends of the vertical tubes 208 in position as shown, the partition 218 thereby cooperating with the tubes 208 to direct the flow of combustion gas into the manifold chamber 222. The lower ends of the vertical tubes 208 are retained and supported by a pair of generally horizontal plates 226 and 228 located in the base portion 202 just above the combustion chamber 204. As best seen on FIG. 11, the uppermost of the horizontal plates 226 contains a plurality of generally circular openings 230, the diameters of which correspond to the outer diameters of the vertical tubes 208. The circular openings 230 in the upper horizontal plate 226 are the same in number and are aligned with the openings 224 in the horizontal partition 218. The lower of the horizontal plates 228 is parallel to and spaced apart from the upper horizontal plate 226 and includes an equal plurality of aligned circular openings 232 having diameters substantially the same as the inside diameters of the vertical tubes 208. In this manner, the vertical tubes are suitably supported by the lower horizontal plate 228 and are maintained in place by the partition 218 and the upper horizontal plate 226. One or more of the tubes may be conveniently removed for cleaning or replacement by simply removing covering member 229 and sliding the tube straight upwardly until it clears the partition 218. The covering member 229 is not essential to the operation of the air heating apparatus 200 and is provided only to protect the heating apparatus from the elements.

The partition 218 further includes port means, for example, a second plurality of generally circular openings 236, as shown in FIG. 12, extending therethrough which provides a communication between the manifold chamber 222 and the heat exchange chamber 220. A suitably sized air exhaust means or opening 234, which is generally square in this instance, is provided in the right side of the base portion 202 to correspond to the lower portion of the second air inlet opening 49 to the dryer 10, the upper portion of opening 49 being closed by a plate or the like (not shown). In this manner, the hot air fan 44 of dryer through the central dryer chamber 134, dryer inlet opening 49 and aligned air heating apparatus opening 234 provides a means for moving air through the air heating apparatus 200 as will hereinafter become apparent.

As shown on FIG. 10, the air heating apparatus 200 is set up to provide a flow of direct heated air. As shown, combustion gases from the burner 206 are exhausted from the combustion chamber 204 by means of the vertical tubes 208. The combustion gases pass upwardly through the tubes into the upper or manifold chamber 222 of the tubular structure. As the hot combustion gases pass through the tubes 208, much of the heat is absorbed and retained by the tubes 208. As discussed above, the dryer hot air fan 44 draws air into the dryer through the inlet opening 49 in dryer end panel 16. Since the inlet opening 49 communicates directly with the opening 234 in the air heating apparatus 200, the heater fan 44 also draws ambient air into the air heating apparatus 200 through the air inlet means or perforations 223 in the walls of the manifold chamber 222. The hot combustion gases exhausted into the manifold chamber 222 combine with the ambient air drawn in through the air inlet means 223 and the combined heated air flow is drawn through the circular openings 236 in the partition 218 and into the heat exchange chamber 220, (as shown by the flow arrows), where it comes in contact with the hot tubes 208 and is further heated. The combined heated air then passes further down between and around the vertical tubes 208 and through the opening 234 and into the dryer where it is used to dry the grain in the manner described in detail above.

When employing the air heating apparatus 200 as an indirect heater as shown on FIG. 13, the tubular structure 210 is reversed end-for-end as described above and an additional plate 238 is placed on top of the partition 218. The plate 238 includes a plurality of circular openings 240, which correspond in number and alignment with the circular openings 240 in partition 218. The vertical tubes 208 extend through the circular openings 240 in the plate 238. The plate 240 contains no other openings, so it functions to block off openings 236 in the partition 218, and thereby prevents the combustion gases exhausted from the vertical tubes 208 from passing downwardly into the heat exchange chamber. Instead, the combustion gases pass upwardly and are exhausted to the atmosphere as shown between covering member 229, which is supported by projections 241, and flange 216. Ambient air is drawn into the apparatus through the air inlet means 223 (now located in the heat exchange chamber) as shown in FIG. 13, passes around the hot vertical tubes 208 and is heated thereby. The heated ambient air is then drawn into the dryer 10 through the opening 234.

A plurality of small openings or passageways 242 are provided in the base portion 202 adjacent the lower ends of the vertical tubes 208. The openings 242 allow a small flow of ambient air to be drawn into the air heating apparatus 200 for cooling the lower ends of the vertical tubes 208 and the horizontal supporting plates 226 and 228. After serving its cooling function, the air drawn in through the openings 224 (which is then heated air) passes around the hot vertical tubes 208 where it is further heated and combines with the rest of the heated air for use in the dryer 10.

From the foregoing description, it can be seen that the present invention comprises a modular column dryer which may be utilized for drying particulate material of different sizes by simply selecting the removable modules with side wall perforations of the size particularly suited for efficient drying of the selected material to be dried. It will be recognized by those skilled in the art that changes or modifications may be made to the above-described embodiments without departing from the broad inventive concepts of the invention. It is understood, therefore, that this invention is not limited to the particular embodiments disclosed, but it is intended to cover all modifications which are within the scope and spirit of the invention as defined by the appended claims.

What is claimed is:

1. A gravity flow dryer for particulate material comprising:

a vertical dryer housing having at least one generally vertical drying column for drying the particulate material;

a removable drying column module supported in the housing and comprised of at least one support member and a first pair of generally vertical side panels having perforations therein, said side panels being fixed to the support member to form a generally vertical drying column adapted to receive particulate material and direct the material vertically downwardly through the housing for drying the particulate material and providing essentially all of a drying column for the dryer;

means for introducing moist particulate material into a top portion of the drying column module;

means for introducing drying air into the drying column module through the perforations in at least one of the side panels for drying the particulate material in the drying column module; and means for removing dried particulate material from a bottom portion of the drying column module.

2. The dryer as recited in claim 1 wherein the drying column module further comprises a second pair of generally vertical side panels having perforations therein, the second pair of side panels being fixed to at least one support member to form a second generally vertical drying column to receive particulate material and direct the material vertically downwardly through the housing and providing essentially all of another drying column for the dryer, the second column being spaced from and generally parallel to the first-mentioned vertical drying column to provide a plenum chamber within the module between the first and second vertical drying columns, the drying air passing into the plenum chamber and further passing through the first and second columns on opposite sides of the plenum chamber the first and second columns with the plenum chamber defined therebetween providing a single unit for the removable drying column module.

3. The dryer as recited in claim 2 wherein the module further comprises drying air distribution means within the plenum chamber for receiving the drying air and for distributing the drying air in the plenum chamber and through the perforations in the drying columns.

4. The dryer as recited in claim 3 wherein the drying air distribution means comprising adjustable damper means extending across the plenum chamber and the drying air is directed across an upper portion of the plenum chamber above the damper means, the damper means providing a tapered opening extending across the plenum chamber and being connected at its larger open end to be in close communication with the means for introducing drying air, whereby the drying air passes through the damper means to provide a generally uniform distribution of drying air into a lower portion of the plenum chamber.

5. The dryer as recited in claim 3 wherein the drying air distribution means comprises a hollow tapered perforate tube extending into the plenum chamber, the tube being connected at the larger end to the means for introducing drying air, whereby drying air enters the perforate tube and is exhausted through the tube perforations into the plenum chamber for generally uniform distribution along the tube into the plenum chamber.

6. The dryer as recited in claim 3 wherein the drying air distribution means comprises a hollow tube extending across the plenum chamber, a first end of the tube being connected to the means for introducing drying air, the tube including a plurality of perforations therein, the perforations decreasing along the length of the tube from the first end, whereby drying air enters the tube and is exhausted through the perforations into the plenum chamber for generally uniform distribution along the tube into the plenum chamber.

7. The dryer as recited in claims 2, 3, 4, 5 or 6 further including means for providing a flow of cooling air and a cooling air distribution duct extending into a lower portion of the plenum chamber, the cooling air distribution duct being positioned in the plenum chamber as part of the removable drying column module and receiving the flow of cooling air and having at least one perforate side wall for directing the flow of cooling air into at least one of the drying columns.

8. The dryer as recited in claim 1 further including a second removable drying column module substantially the same as the first module and having the perforations in the side panels of a larger size than the perforations in the side panels of the first module for directing particulate material of a larger size through the second module than the particulate material directed through the first module to permit increased air flow through each perforation of the second module without particulate material passing through the perforations, whereby the first module may be removed from the housing and replaced with the second module for drying the larger particulate material.

* * * * *